United States Patent
Ki et al.

(10) Patent No.: US 12,252,635 B2
(45) Date of Patent: Mar. 18, 2025

(54) ADHESIVE COMPOSITION AND DISPLAY APPARATUS INCLUDING THE SAME

(71) Applicant: SAMSUNG DISPLAY CO., LTD., Yongin-si (KR)

(72) Inventors: Bookan Ki, Yongin-si (KR); Kyungmi Kwon, Yongin-si (KR); Wonseok Kim, Yongin-si (KR); Hoyun Byun, Yongin-si (KR); Jeongin Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 711 days.

(21) Appl. No.: 17/469,358

(22) Filed: Sep. 8, 2021

(65) Prior Publication Data

US 2022/0204818 A1 Jun. 30, 2022

(30) Foreign Application Priority Data

Dec. 29, 2020 (KR) ........................ 10-2020-0186768

(51) Int. Cl.
*C09J 133/10* (2006.01)
*C08F 20/06* (2006.01)
(Continued)

(52) U.S. Cl.
CPC ............. *C09J 133/10* (2013.01); *C08F 20/06* (2013.01); *G02B 1/04* (2013.01); *G02B 1/14* (2015.01);
(Continued)

(58) Field of Classification Search
None
See application file for complete search history.

(56) References Cited

U.S. PATENT DOCUMENTS 9,018,304 B2 4/2015 Kim et al.
9,382,457 B2 7/2016 Kim et al.
(Continued)

FOREIGN PATENT DOCUMENTS

KR 10-2012-0072163 7/2012
KR 10-2013-0101783 9/2013
(Continued)

OTHER PUBLICATIONS

Ma, et al., "Effect of 2-Ethylhexyl Acrylate and N-Acryloylmorpholine on the Properties of Polyurethane/Acrylic Hybrid Materials", J. Appl. Polym. Sci. 2014, DOI: 10.1002/APP.41463, 8 pages.

*Primary Examiner* — Eli D. Strah
(74) *Attorney, Agent, or Firm* — F. CHAU & ASSOCIATES, LLC

(57) ABSTRACT

Provided are an adhesive composition having enhanced reliability at edge portions of a display apparatus and the display apparatus, the display apparatus including a display panel displaying an image to the outside, a cover window arranged on the display panel, and an adhesive layer interposed between the display panel and the cover window, the adhesive layer including an adhesive composition including (meth)acrylate having an alicyclic group, a low-temperature glass transition (meth)acrylic monomer, (meth)acrylate having a hydroxyl group, a high-temperature glass transition (meth)acrylic monomer, and a reactive diluent monomer, in which a maximum value of stress of the adhesive composition, with the stress changing over time when a strain of 25% is applied at 60° C. to the adhesive layer, is from about 30000 Pa to about 40000 Pa.

20 Claims, 13 Drawing Sheets

(51) Int. Cl.
*G02B 1/04* (2006.01)
*G02B 1/14* (2015.01)
*G06F 1/16* (2006.01)

(52) U.S. Cl.
CPC ........ *G06F 1/1652* (2013.01); *B32B 2457/20* (2013.01); *C09K 2323/057* (2020.08)

(56) References Cited

U.S. PATENT DOCUMENTS

| | | |
|---|---|---|
| 10,227,513 B2 | 3/2019 | Moon et al. |
| 10,392,533 B2 | 8/2019 | Imoto et al. |
| 2019/0316004 A1* | 10/2019 | Clapper .................... B32B 7/12 |
| 2022/0204815 A1* | 6/2022 | Youn .................... H10K 50/841 |

FOREIGN PATENT DOCUMENTS

| | | | |
|---|---|---|---|
| KR | 10-1562088 | 10/2015 | |
| KR | 10-2016-0040252 | 4/2016 | |
| KR | 10-1648313 | 8/2016 | |
| KR | 10-1765551 | 8/2017 | |
| KR | 20190083167 A * | 7/2019 | ............ C09J 133/08 |
| KR | 10-2008182 | 8/2019 | |

* cited by examiner

FIG. 7

| | EMBODIMENT | COMPARATIVE EXAMPLE B | COMPARATIVE EXAMPLE C | COMPARATIVE EXAMPLE D | COMPARATIVE EXAMPLE E | COMPARATIVE EXAMPLE F |
|---|---|---|---|---|---|---|
| PENETRATING BUBBLE GENERATION RATIO | 0/18 | 6/19 | 13/19 | 18/18 | 5/18 | 4/18 |
| Monomer | 2-Ethylhexy acrylate; Isobornyl acrylate; Octyl methacrylate; 4-Hydroxybutyl acrylate; 4-Acryloylmorpholine (Tg: 147°C); Benzyl acrylate (Tg: 277°C) | 2-Ethylhexy acrylate; Isobornyl acrylate; Octyl methacrylate | 2-Ethylhexy acrylate; Isobornyl acrylate; Octyl methacrylate | 2-Ethylhexy acrylate; Isobornyl acrylate; Octyl methacrylate; Isophorone diisocyanate (SMALL AMOUNT) | 2-Ethylhexy acrylate; Isobornyl acrylate; Octyl methacrylate | 2-Ethylhexy acrylate (Tg: −50°C); Isobornyl acrylate (Tg: 94°C); Octyl methacrylate (Tg: −20°C) |

FIG. 8

| | PENETRATING BUBBLES | | | |
|---|---|---|---|---|
| | NUMBER OF BUBBLES | Image | size (μm) | PENETRATION DISTANCE (μm) |
| EMBODIMENT | 0/18 | — | — | — |
| COMPARATIVE EXAMPLE B | 6/19 | | 39~120 | 320~430 |
| COMPARATIVE EXAMPLE C | 13/19 | | 75~105 | 210~362 |
| COMPARATIVE EXAMPLE D | 18/18 | | 50~72 | 366~433 |
| COMPARATIVE EXAMPLE E | 5/18 | | 114~141 | 356~456 |
| COMPARATIVE EXAMPLE F | 4/18 | | 100~190 | 240~340 |

FIG. 9

|  |  | COMPARATIVE EXAMPLE A | EMBODIMENT |
|---|---|---|---|
| PENETRATING BUBBLES | #1 | 2 | – |
|  | #2 | 4~5 |  |
|  | SIZE (μm) | 70~114 |  |
|  | DISTANCE (μm) | 166~348 |  |
| COMPOSITION (wt%) | IBOA | 5.94 | 6.31 |
|  | 2-EHA | 16.21 | 26.34 |
|  | 4-HBA | 12.68 | 11.31 |
|  | 4-AcM | 32.16 | 42.57 |
|  | Benzyl acrylate | 33.00 | 13.48 |

ADHESIVE COMPOSITION AND DISPLAY APPARATUS INCLUDING THE SAME

CROSS-REFERENCE TO RELATED APPLICATION

This application claims priority under 35 U.S.C. § 119 to Korean Patent Application No. 10-2020-0186768, filed on Dec. 29, 2020, in the Korean Intellectual Property Office, the disclosure of which is incorporated by reference herein in its entirety.

TECHNICAL FIELD

The present disclosure relates to an adhesive composition and a display apparatus, and more particularly, to an adhesive composition having enhanced reliability at edge portions of a display apparatus and the display apparatus.

DISCUSSION OF RELATED ART

Recently, display apparatuses have been used for various purposes, and as the display apparatuses become thin and lightweight, the range of use thereof may be further expanding. Also, as the usage range of the display apparatuses is diversifying, various design methods for designing a form of a display apparatus are being researched.

A display apparatus includes a cover window located on a display panel to protect lower structures, and an optically clear adhesive (OCA) is used to bond the cover window to the display panel. The OCA basically needs to have excellent optical properties, high resistance to moisture and heat, and good adhesion.

SUMMARY

Embodiments of the present disclosure include an adhesive composition having enhanced reliability at edge portions of a display apparatus and the display apparatus. However, the presented embodiments are just examples, and the scope of the present disclosure is not limited thereto.

Additional aspects will be set forth in part in the description which follows and, in part, will be apparent from the description, or may be learned by practice of the presented embodiments of the present disclosure.

According to an embodiment of the present disclosure, an adhesive composition includes (meth)acrylate having an alicyclic group, a low-temperature glass transition (meth)acrylic monomer, (meth)acrylate having a hydroxyl group, a high-temperature glass transition (meth)acrylic monomer, and a reactive diluent monomer, in which a maximum value of a stress of the adhesive composition, with the stress changing over time when a strain of 25% is applied at 60° C. to an adhesive layer of the adhesive composition, is from about 30000 Pa to about 40000 Pa.

The (meth)acrylate having an alicyclic group may be included in about 5 wt % to about 10 wt %.

The low-temperature glass transition (meth)acrylic monomer may be included in about 20 wt % to about 30 wt %.

The (meth)acrylate having a hydroxyl group may be included in about 5 wt % to about 15 wt %.

The high-temperature glass transition (meth)acrylic monomer may be included in about 40 wt % to about 60 wt %.

The reactive diluent monomer may be included in about 10 wt % to about 20 wt %.

A strain of the adhesive composition at 60° C. according to creep characteristics may be from about 50% to about 60%.

tan δ of the adhesive composition at 60° C. may be from about 0.4 to about 0.55.

The high-temperature glass transition (meth)acrylic monomer may include acryloylmorpholine.

According to an embodiment of the present disclosure, a display apparatus includes a display panel, a cover window arranged on the display panel, and an adhesive layer interposed between the display panel and the cover window, in which the adhesive layer includes an adhesive composition including (meth)acrylate having an alicyclic group, a low-temperature glass transition (meth)acrylic monomer, (meth)acrylate having a hydroxyl group, a high-temperature glass transition (meth)acrylic monomer, and a reactive diluent monomer, in which a maximum value of stress of the adhesive composition, with the stress changing over time, when a strain of 25% is applied at 60° C. to the adhesive layer, is from about 30000 Pa to about 40000 Pa.

The (meth)acrylate having an alicyclic group may be included in about 5 wt % to about 10 wt %.

The low-temperature glass transition (meth)acrylic monomer may be included in about 20 wt % to about 30 wt %.

The (meth)acrylate having a hydroxyl group may be included in about 5 wt % to about 15 wt %.

The high-temperature glass transition (meth)acrylic monomer may be included in about 40 wt % to about 60 wt %.

The reactive diluent monomer may be included in about 10 wt % to about 20 wt %.

A strain of the adhesive composition at 60° C. according to creep characteristics may be from about 50% to about 60%.

tan δ of the adhesive composition at 60° C. may be from about 0.4 to about 0.55.

The high-temperature glass transition (meth)acrylic monomer may include acryloylmorpholine.

The display panel may include a display layer including a display element, and an optical functional layer arranged above the display layer, in which the optical functional layer includes a polarization film or a color filter layer.

The display apparatus may include a bending area that is at least partially bent, and the display panel and the cover window corresponding to the bending area may be bent.

According to an embodiment of the present disclosure, a display apparatus includes a display panel, a cover window arranged on the display panel, and an adhesive layer interposed between the display panel and the cover window, in which the adhesive layer includes an adhesive composition including (meth)acrylate having an alicyclic group, a low-temperature glass transition (meth)acrylic monomer, (meth)acrylate having a hydroxyl group, a high-temperature glass transition (meth)acrylic monomer, and a reactive diluent monomer, in which the high-temperature glass transition (meth)acrylic monomer is included in about 40 wt % to about 60 wt % and the reactive diluent monomer is included in about 10 wt % to about 20 wt %.

The high-temperature glass transition (meth)acrylic monomer may include acryloylmorpholine, and the reactive diluent monomer may include benzyl acrylate.

In addition to the aforesaid details, other aspects and features will be clarified from the following drawings, claims, and detailed description.

BRIEF DESCRIPTION OF THE DRAWINGS

The above and other aspects and features of embodiments of the present disclosure will be more apparent from the following description taken in conjunction with the accompanying drawings, in which:

FIG. 7 is a table comparing monomer components of an embodiment of the present disclosure including an adhesive composition and comparative examples;

FIG. 8 is a table comparing an embodiment of the present disclosure including an adhesive composition according to an embodiment of the present disclosure to comparative examples, according to generation of penetrating bubbles;

FIG. 9 is a table comparing specific components and generation of penetrating bubbles of an embodiment of the present disclosure including an adhesive composition according to an embodiment of the present disclosure and a comparative example;

Figure 1:
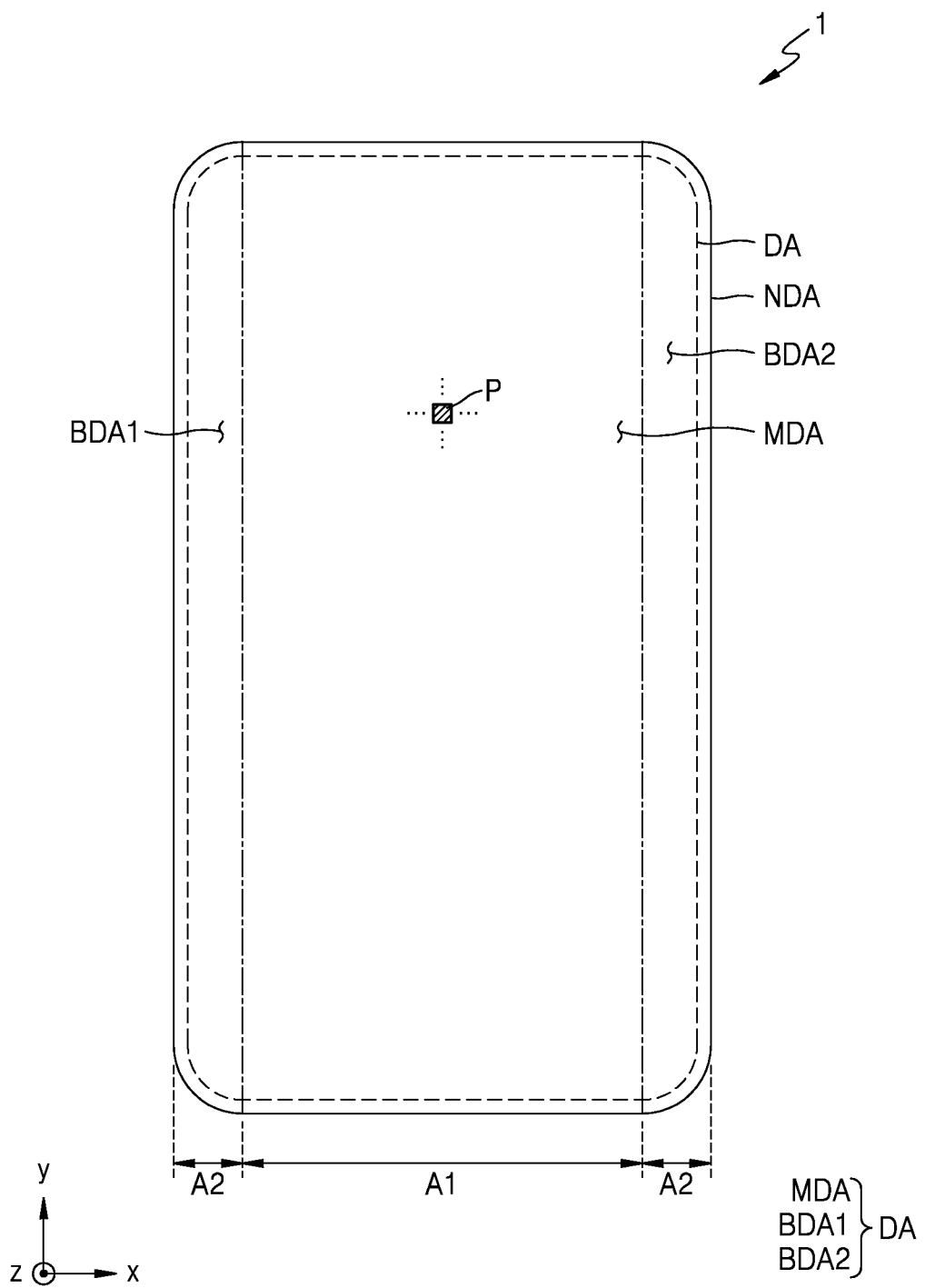
FIGS. 1 and 2 are plan views each schematically illustrating an electronic device including a display apparatus according to an embodiment of the present disclosure.

Since the drawings in FIGS. 1-13 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

Reference will now be made in detail to embodiments of the present disclosure, examples of which are illustrated in the accompanying drawings, in which like reference numerals refer to like elements throughout. In this regard, the embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, particular embodiments will be illustrated in the drawings and described in detail in the written description. The effects and features of the present disclosure, and ways to achieve them will become apparent by referring to embodiments that will be described later in detail with reference to the accompanying drawings. However, the present disclosure is not limited to the following embodiments but may be embodied in various forms.

Hereinafter, embodiments of the present disclosure will be described in detail with reference to the accompanying drawings, and in the description with reference to the drawings, like reference numerals refer to like elements and redundant descriptions thereof will be omitted.

It will be understood that although the terms such as "first", "second", etc., may be used herein to describe various elements, these elements should not be limited by these terms. These terms are only used to distinguish one element from another.

Herein, the singular forms include the plural forms unless the context clearly indicates otherwise.

Herein, it is to be understood that the terms such as "including" or "having" are intended to indicate the existence of the features or elements disclosed in the specification, and are not intended to preclude the possibility that one or more other features or elements may be added.

Herein, it will be understood that when a portion such as a layer, an area, or an element is referred to as being "on" or "above" another portion, it can be directly on or above the other portion, or an intervening portion may also be present.

Herein, it will be understood that when a portion such as a layer, an area, or an element is referred to as being "connected" to another portion, it can be directly connected to the other portion, or an intervening portion may also be present. For example, throughout the specification, it will be understood when a portion such as a layer, an area, or an element is referred to as being "electrically connected" to another portion, it can be directly electrically connected to the other portion, or it can be indirectly electrically connected to the other portion with an intervening portion interposed therebetween.

In the present specification, "A and/or B" refers to A, B, or A and B. In addition, "at least one of A and B" refers to A, B, or A and B.

Herein, an x-axis, a y-axis, and a z-axis are not limited to three axes on a rectangular coordinates system but may be construed as including these axes. For example, an-x axis, a y-axis, and a z-axis may be at right angles or may also indicate different directions from one another, which are not at right angles.

When the term "about" is used in this specification in connection with a numerical value, it is intended that the associated numerical value includes a tolerance of up to ±10% around the stated numerical value.

When an embodiment is implementable in another manner, a predetermined process order may be different from a described one. For example, two processes that are consecutively described may be substantially simultaneously performed or may be performed in an opposite order to the described order.

Figure 2:
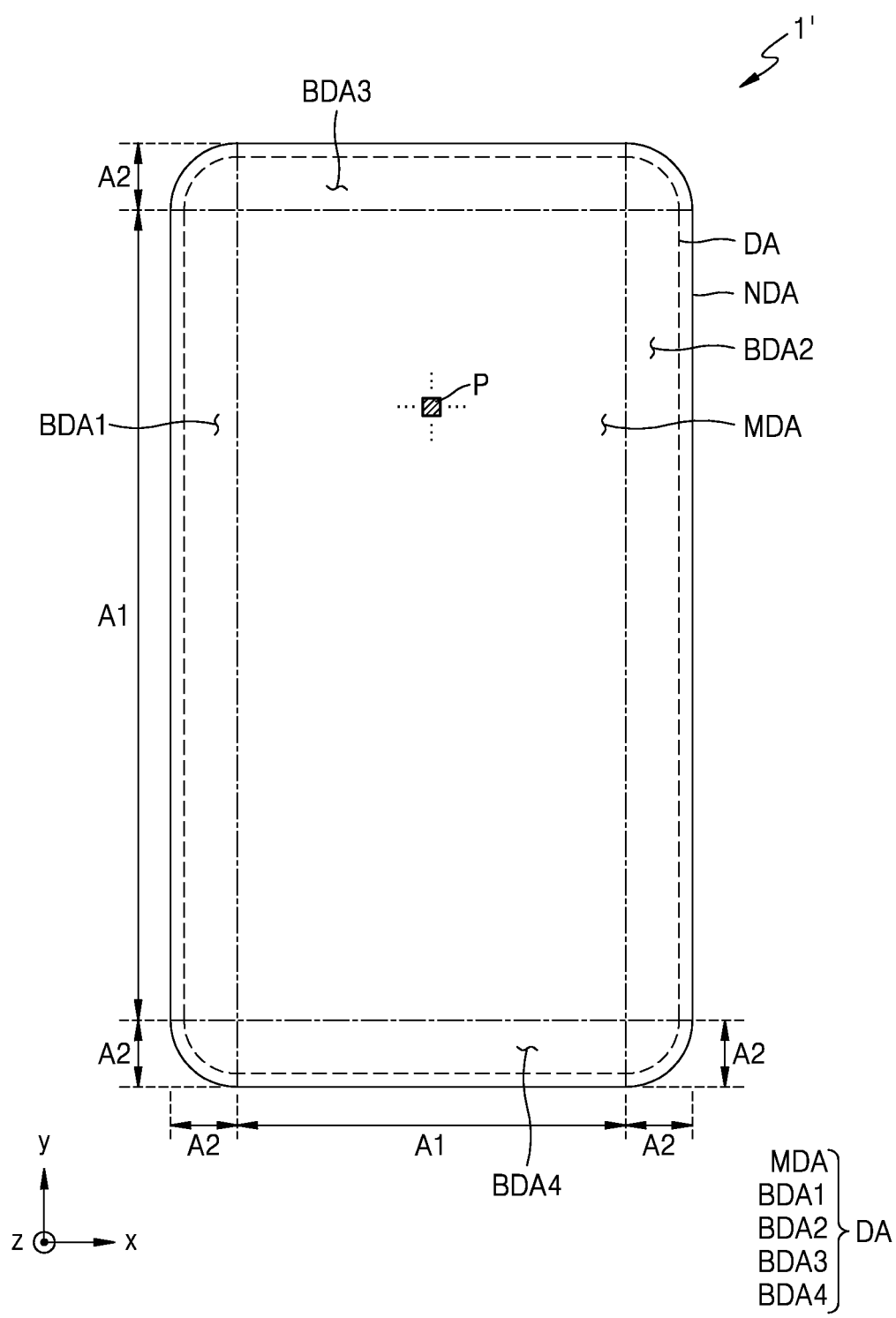

FIGS. 1 and 2 are plan views each schematically illustrating an electronic device including a display apparatus according to an embodiment of the present disclosure.

Display apparatuses 1 and 1' described below with reference to the drawings may each include an apparatus displaying a moving image or a still image, and may be used as a display screen of not only portable electronic devices such as, for example, a mobile phone, a smartphone, a tablet personal computer (PC), a mobile communication terminal, an electronic notebook, an electronic book, a portable multimedia player (PMP), a navigation device, and an ultra mobile PC (UMPC), but also as a display screen of various products such as, for example, TVs, notebook computers, monitors, billboards, internet of things (IoT), and/or the like. Also, a display apparatus according to an embodiment of the present disclosure may be used in wearable devices such as, for example, a smartwatch, a watch phone, a glasses-type display, and a head-mounted display (HMD). In addition, the display apparatus according to an embodiment of the present disclosure may be used as a display in an instrument panel of a vehicle and a center information display (CID) arranged on a center fascia or a dashboard of a vehicle, a room mirror display for replacing side-view mirrors of a vehicle, or a display arranged on a rear surface of a front seat for providing entertainment content to a passenger in a back seat of a vehicle.

Referring to FIGS. 1 and 2, the display apparatus 1 includes a display area DA and a peripheral area NDA outside the display area DA. In the display area DA, a plurality of pixels P including a display element may be arranged, and the display apparatus 1 may provide an image by using light emitted from the plurality of pixels P arranged in the display area DA. In an embodiment of the present disclosure, the pixels P may be arranged in various forms such as, for example, a stripe arrangement, a pentile arrangement, a mosaic arrangement, and the like, to implement an image. The peripheral area NDA may be a type of non-display area where display elements are not arranged, and the display area DA may be entirely surrounded by the peripheral area NDA.

The display area DA of the display apparatus 1 illustrated in FIGS. 1 and 2 have a quadrangular shape with round corners. For example, the display area DA of the display apparatus 1 may have a rectangular shape, and may have short sides in a first direction (x-axis direction) and long sides in a second direction (y-axis direction). The corner where the short side in the first direction (x-axis direction) meets the long side in the second direction (y-axis direction) may be formed to have a round shape with a predetermined curvature or have a right-angled shape. However, the present disclosure is not limited thereto. According to an embodiment of the present disclosure, the display area DA may have, for example, a circular shape, an oval shape, or a polygonal shape such as, for example, a triangle, a pentagon or a hexagon.

Herein, as the display apparatus 1 according to an embodiment of the present disclosure, an organic light-emitting display apparatus is described as an example, but the present disclosure is not limited thereto. According to an embodiment of the present disclosure, the display apparatus 1 may be, for example, an inorganic light-emitting display apparatus, an inorganic electroluminescent (EL) display apparatus, or a quantum dot light-emitting display apparatus. For example, an emission layer of a display element included in the display apparatus 1 may include, for example, an organic material, an inorganic material, quantum dots, both an organic material and quantum dots, or both an inorganic material and quantum dots.

While the display apparatus 1 having a flat shape before being bent is illustrated in FIGS. 1 and 2, the display apparatus 1 according to an embodiment of the present disclosure may include a 3D-type display surface or a curved display surface. When the display apparatus 1 includes a 3D-type display surface, the display apparatus 1 may include a plurality of display areas oriented in different directions from each other, for example, a polygonal pillar-type display surface. For example, images of the 3D-type display surface may be generated within a display volume rather than upon a stationary surface, and may include a polyprism surface. According to an embodiment of the present disclosure, when the display apparatus 1 includes a curved display surface, the display apparatus 1 may include a flexible material, and may be bendable, foldable, and/or rollable.

The display apparatus 1 of FIG. 1 may include a first area A1 and second areas A2 respectively arranged on two sides of the first area A1. For example, the first area A1 and second areas A2 may constitute the display area DA, and may be surrounded by the peripheral area NDA. The first area A1 may be, for example, a non-bending area, and the second areas A2 may be bending areas bent with a preset curvature. The display apparatus 1 including a bending area indicates that each of layers constituting the display apparatus 1 has a bending area as will be described later with reference to FIG. 3.

According to an embodiment of the present disclosure, the display area DA may include a main display area MDA corresponding to the first area A1 described above and a first bending display area BDA1 and a second bending display area BDA2 respectively corresponding to the second areas A2.

The display apparatus 1' of FIG. 2 may include the first area A1 and the second areas A2 arranged at each edge of each of four surfaces with respect to the first area A1. In an embodiment of the present disclosure, the second areas A2 may surround the first area A1, and may be surrounded by the peripheral area NDA. The first area A1 may be, for example, a non-bending area, and the second areas A2 may be bending areas bent with a preset curvature. The display apparatus 1' according to the present embodiment may have a four-surface bending structure in which edges thereof are bent in different directions from each other.

According to an embodiment of the present disclosure, the display area DA may include a main display area MDA corresponding to the first area A1 described above and first through fourth bending display areas BDA1 through BDA4 (i.e., BDA1, BDA2, BDA3 and BDA4) respectively corresponding to the second areas A2. The first through fourth bending display areas BDA1 through BDA4 may be bent in different directions from each other.

Figure 3:
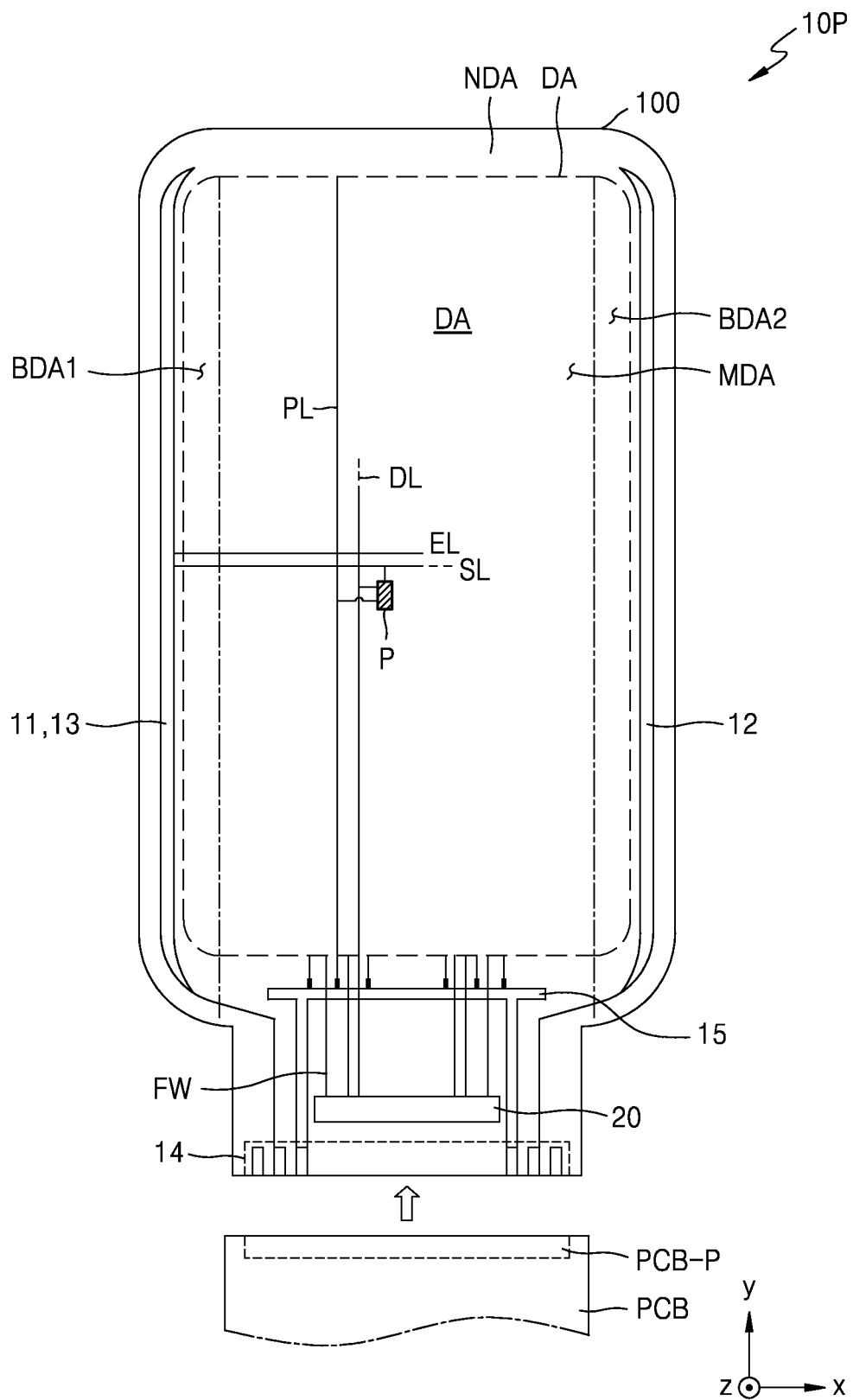
FIG. 3 is a schematic plan view of a display panel according to an embodiment of the present disclosure.
Figure 4:
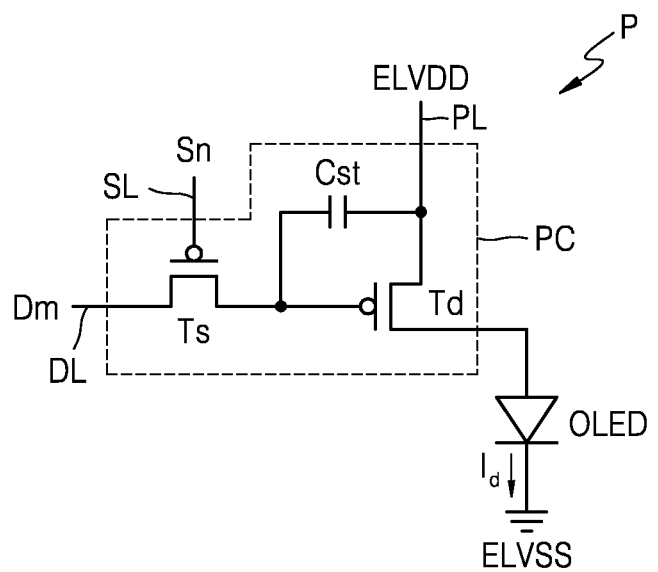
FIG. 4 is an equivalent circuit diagram of a pixel according to an embodiment of the present disclosure.

FIG. 3 is a plan view schematically illustrating a display panel 10P according to an embodiment of the present disclosure, and FIG. 4 is an equivalent circuit diagram of a pixel P according to an embodiment of the present disclosure.

Referring to FIG. 3, the display panel 10P includes a substrate 100, and various components constituting the display panel 10P are arranged on the substrate 100.

The display area DA may include a main display area MDA, which is a non-bending area, and first and second bending display areas BDA1 and BDA2, which are bending areas in contact with the non-bending area. The first and second bending display areas BDA1 and BDA2 may be respectively arranged on two sides with the main display area MDA disposed therebetween. For example, the first and second bending display areas BDA1 and BDA2 may be arranged adjacent to first and second scan driving circuits 11 and 12, respectively. The first and second scan driving circuits 11 and 12 may be arranged in the peripheral area NDA, and respectively located on two sides of the display area DA.

A plurality of pixels P may be arranged in the display area DA. The plurality of pixels P may include at least one sub-pixel, and may be implemented using a display element such as an organic light-emitting diode OLED. The plurality of pixels P may emit, for example, red, green, blue, or white light.

The plurality of pixels P arranged in the display area DA may be electrically connected to outer circuits arranged in the peripheral area NDA, which is a non-display area. The first scan driving circuit 11, the second scan driving circuit 12, an emission control driving circuit 13, a terminal 14, and a first power supply line 15 may be arranged in the peripheral area NDA. A second power supply line may be arranged in an outer portion of the first and second scan driving circuits 11 and 12 and the emission control driving circuit 13.

The first scan driving circuit 11 may be configured to provide a scan signal to the plurality of pixels P via a scan line SL. The second scan driving circuit 12 may be arranged in parallel with the first scan driving circuit 11 with the display area DA disposed therebetween. Some of the plurality of pixels P arranged in the display area DA may be electrically connected to the first scan driving circuit 11, and the others may be electrically connected to the second scan driving circuit 12. According to an embodiment of the present disclosure, the second scan driving circuit 12 may be omitted.

The emission control driving circuit 13 may be arranged at a side of the first scan driving circuit 11, and may be configured to provide an emission control signal to the pixels P via an emission control line EL. While the emission control driving circuit 13 is illustrated as being arranged only at one side of the display area DA in FIG. 3, the emission control driving circuit 13 may also be arranged at two sides of the display area DA like the first and second scan driving circuits 11 and 12. Alternatively, the first scan driving circuit 11 may be omitted, and thus, the second scan driving circuit 12 and emission control driving circuit 13 may each be disposed in the peripheral area NDA adjacent to each of the long sides of the display area DA, located opposite to each other with the display area DA interposed therebetween, and extending substantially parallel to each other in the y-axis direction.

The terminal 14 may be arranged in the peripheral area NDA of the substrate 100. The terminal 14 may not be covered by an insulating layer but exposed and electrically connected to a printed circuit board PCB. A terminal PCB-P of the printed circuit board PCB may be electrically connected to the terminal 14 of the display panel 10P. For example, the terminal PCB-P may be electrically connected to the terminal 14 located at a side adjacent to the lower end of the display panel DP in the peripheral area NDA.

The printed circuit board PCB is configured to transfer a signal or power of a controller to the display panel 10P. A control signal generated by the controller may be transferred to each of the first and second scan driving circuits 11 and 12 and the emission control driving circuit 13 via the printed circuit board PCB. Also, the controller may provide a driving voltage ELVDD (see FIG. 4) to the first power supply line 15, and a common voltage ELVSS (see FIG. 4) to the second power supply line. The driving voltage ELVDD may be provided to the pixel P via a driving voltage line PL connected to the first power supply line 15, and the common voltage ELVSS may be provided to an opposite electrode of a pixel connected to the second power supply line. The first power supply line 15 may extend below the second areas A2 in the first direction (for example, an x-axis direction). The second power supply line may have a loop shape having one side open in the peripheral area NDA.

The controller may generate a data signal, and the data signal may be transferred to an input line FW via a data pad unit 20, and to the pixel P via a data line DL connected to the input line FW.

Referring to FIG. 4, each pixel P may include a pixel circuit PC connected to the scan line SL and the data line DL, and an organic light-emitting diode OLED connected to the pixel circuit PC.

The pixel circuit PC may include a driving thin-film transistor Td, a switching thin-film transistor Ts, and a storage capacitor Cst. The organic light-emitting diode OLED may generate light in response to electrical signals transmitted from the driving thin-film transistor Td and the switching thin-film transistor Ts. The switching thin-film transistor Ts may be connected to the scan line SL and the data line DL, and may be configured to transfer a data signal Dm input via the data line DL, to the driving thin-film transistor Td, according to a scan signal Sn input via the scan line SL.

The storage capacitor Cst may be connected to the switching thin-film transistor Ts and the driving voltage line PL and may store a voltage corresponding to a difference between a voltage received from the switching thin-film transistor Ts and the driving voltage ELVDD supplied to the driving voltage line PL. The common voltage ELVSS may be supplied to a counter electrode of the organic light-emitting diode OLED.

The driving thin-film transistor Td may be connected to the driving voltage line PL and the storage capacitor Cst, and may control a driving current $I_d$ flowing from the driving voltage line PL to the organic light-emitting diode OLED, in accordance with a voltage value stored in the storage capacitor Cst. The organic light-emitting diode OLED may emit light of a certain brightness, according to the driving current $I_d$. For example, the organic light-emitting diode OLED may emit light using the driving voltage ELVDD (positive output) and the common voltage ELVSS (negative output), and here, an intensity of the light emitted from the organic light-emitting diode OLED may be determined by an amount of charges stored in the storage capacitor Cst.

While FIG. 4 describes the pixel circuit PC including two thin-film transistors and one storage capacitor, the present disclosure is not limited thereto. The number of thin-film transistors and the number of storage capacitors may be changed in various ways according to a design of the pixel circuit PC. For example, the pixel circuit PC may include three or more thin-film transistors and/or two or more storage capacitors. According to an embodiment of the present disclosure, the pixel circuit PC may include three thin-film transistors and two storage capacitors. According to an embodiment of the present disclosure, the pixel circuit PC may include seven thin-film transistors and one storage capacitor.

Figure 5:
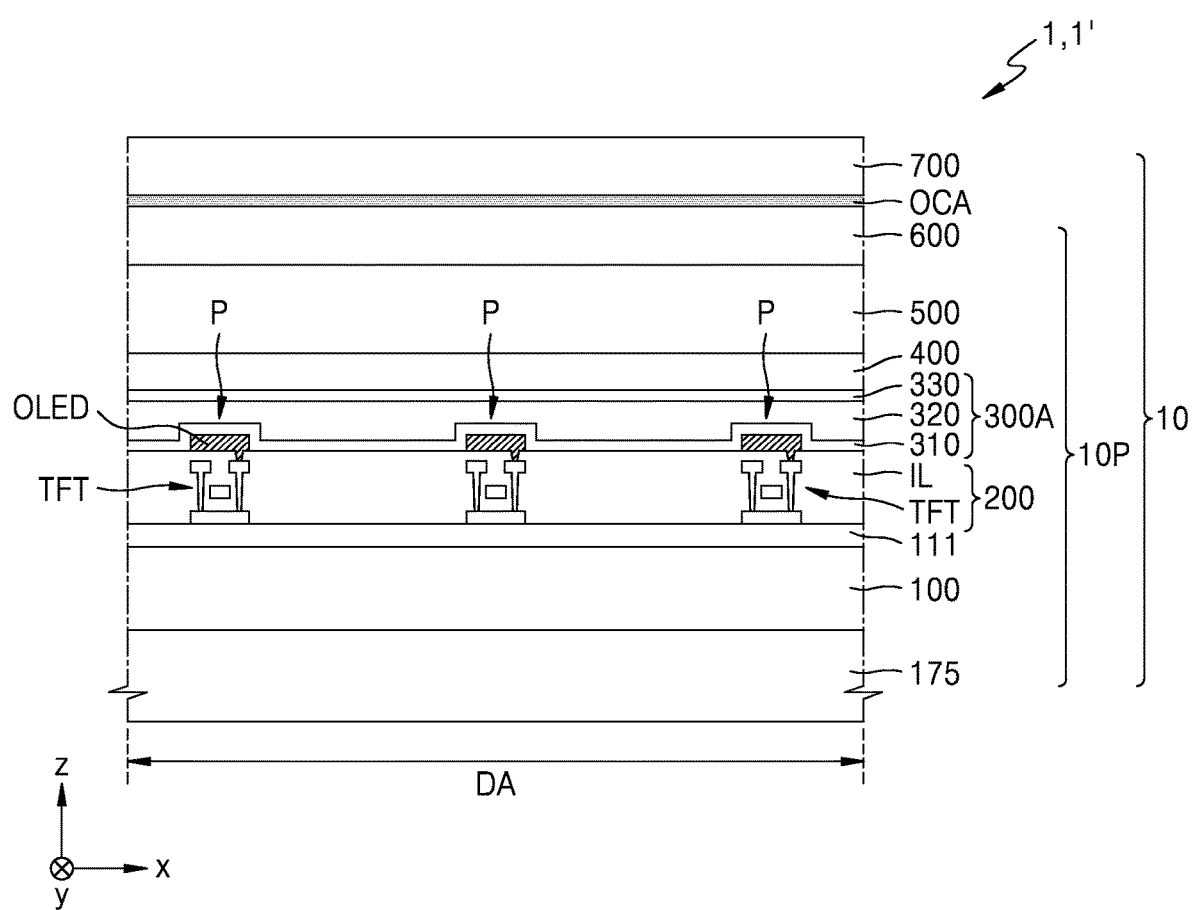
FIG. 5 is a cross-sectional view schematically illustrating a stack structure of a display apparatus according to an embodiment of the present disclosure.
Figure 6:
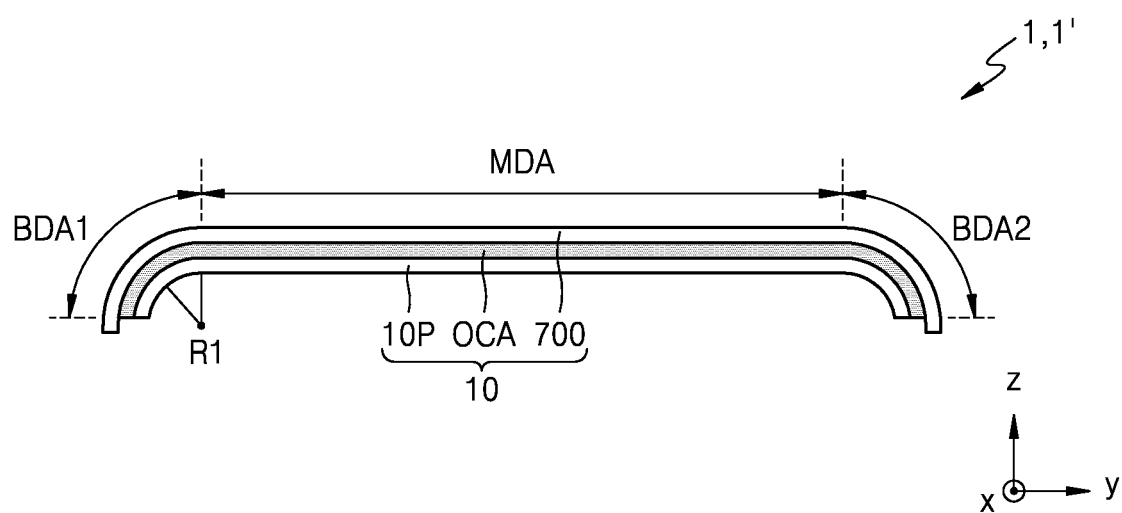
FIG. 6 is a cross-sectional view schematically illustrating a display apparatus according to an embodiment of the present disclosure.

FIG. 5 is a cross-sectional view schematically illustrating a stack structure of the display apparatus 1 or 1' according to an embodiment of the present disclosure, and FIG. 6 is a cross-sectional view schematically illustrating the display apparatus 1 or 1' according to an embodiment of the present disclosure.

The display panel 10P may include a plurality of display elements used to display an image.

Referring to FIG. 5, the display panel 10P may include a substrate 100, a display layer 200 arranged on the substrate 100, and a thin-film encapsulation layer 300A, an input sensing layer 400, an optical functional layer 500, and an anti-reflection layer 600 arranged on the display layer 200.

The substrate 100 may include, for example, glass or a polymer resin. For example, the substrate 100 may include a polymer resin such as, for example, polyether sulfone, polyacrylate, polyether imide, polyethylene naphthalate, polyethylene terephthalate, polyphenylene sulfide, polyarylate, polyimide, polycarbonate, cellulose acetate propionate, or the like. The substrate 100 including a polymer resin may be flexible, and may be foldable, rollable, and/or bendable. The substrate 100 may have a multi-layer structure including a layer including the above-described polymer resin and an inorganic layer. In an embodiment of the present disclosure, the substrate 100 may have a structure of an organic layer/an inorganic layer/an organic layer.

A buffer layer 111 may be arranged on the substrate 100. The buffer layer 111 may reduce or block penetration of foreign substances, moisture, or external air from below the substrate 100, and may provide a flat surface on the substrate 100. The buffer layer 111 may include an inorganic insulating material such as, for example, silicon oxide ($SiO_2$), silicon oxynitride (SiON), or silicon nitride ($Si_3N_4$), and may have a single layer or a multilayer structure including the above-described material. In an embodiment of the present disclosure, the buffer layer 111 may include an organic material, or an organic/inorganic complex, and may have a single layer or a multilayer structure of an inorganic material and an organic material.

The display layer 200 may be arranged on a front surface of the substrate 100, and a lower protective film 175 may be arranged on a rear surface of the substrate 100. The lower protective film 175 may have a function of supporting and protecting the substrate 100, and may include an organic insulating material such as, for example, polyethylene terephthalate (PET) or polyimide (PI). The lower protective film 175 may be attached to a rear surface of the substrate 100. An adhesive layer may be disposed between the lower protective film 175 and the substrate 100. Alternatively, the lower protective film 175 may be directly formed on the rear surface of the substrate 100, and in this case, no adhesive layer may be disposed between the lower protective film 175 and the substrate 100.

The display layer 200 may include a plurality of pixels. The display layer 200 may include a display element layer including an organic light-emitting diode OLED which is a display element, a circuit layer including a thin-film transistor TFT electrically connected to the organic light-emitting diode OLED, and an insulating layer IL. The organic light-emitting diode OLED may be electrically connected to the thin-film transistor TFT to form a pixel P.

The display layer 200 may be sealed using an encapsulation member. According to an embodiment of the present disclosure, the encapsulation member may include the thin-film encapsulation layer 300A as illustrated in FIG. 5. The thin-film encapsulation layer 300A may include at least one inorganic encapsulation layer and at least one organic encapsulation layer. In an embodiment of the present disclosure, the number of organic encapsulation layers and the number of inorganic encapsulation layers and an order of stacking organic encapsulation layers and inorganic encapsulation layers may be variously changed. According to an embodiment of the present disclosure, the thin-film encapsulation layer 300A may include first and second inorganic encapsulation layers 310 and 330 and an organic encapsulation layer 320 interposed therebetween. The first inorganic encapsulation layer 310 and the second inorganic encapsulation layer 330 may protect the pixels P from moisture and/or oxygen. The organic encapsulation layer 320 may protect the pixels P from foreign materials such as dust particles.

In an embodiment of the present disclosure, the encapsulation member may include an encapsulation substrate. The encapsulation substrate may be arranged to face the substrate 100 with the display layer 200 disposed therebetween. There may be a gap between the encapsulation substrate and the display layer 200. The encapsulation substrate may include glass. A sealant may be arranged between the substrate 100 and the encapsulation substrate, and the sealant may be arranged in the peripheral area NDA described above with reference to FIG. 1 or 2. The sealant arranged in the peripheral area NDA may surround the display area DA and prevent lateral penetration of moisture. The gap formed between the encapsulation substrate and the display layer 200 may be maintained by the sealant coupling the substrate 100 and the encapsulation substrate to each other.

The input sensing layer 400 may obtain coordinate information according to an external input, for example, a touch event of an object such as a finger or a stylus pen. The input sensing layer 400 may include a touch electrode and trace lines connected to the touch electrode. The input sensing layer 400 may be used to sense an external input by using a mutual capacitance method or a self-capacitance method. Alternatively, the input sensing layer 400 may sense an external input by using an electromagnetic induction method or a pressure sensing method.

The input sensing layer 400 may be formed on the encapsulation member. Alternatively, the input sensing layer 400 may be separately formed, and then coupled to the encapsulation member via an adhesive layer such as an optically clear adhesive (OCA). According to an embodiment of the present disclosure, the input sensing layer 400 may be formed directly on the thin-film encapsulation layer 300A or the encapsulation substrate, and in this case, no adhesive layer may be formed between the input sensing layer 400 and the thin-film encapsulation layer 300A or the encapsulation substrate.

The optical functional layer 500 may be formed on the input sensing layer 400, and may enhance light efficiency. For example, the optical functional layer 500 may be arranged above the display layer 200. In an embodiment of the present disclosure, the optical functional layer 500 may include a polarization film or a color filter layer to enhance the light efficiency. For example, the front-surface light efficiency and/or lateral viewability of light emitted from the organic light-emitting diode OLED may be enhanced.

The anti-reflection layer 600 may be formed on the optical functional layer 500, and may reduce a reflectance of light incident from the outside (external light) to the display panel 10P.

According to an embodiment of the present disclosure, the anti-reflection layer 600 may include an optical plate including a phase retarder and/or a polarizer. The phase retarder may be a film-type or a liquid crystal-coating type, and may include a $\lambda/2$ phase retarder and/or a $\lambda/4$ phase retarder. The polarizer may also be a film-type or a liquid crystal coating-type. The film-type polarizer may include an elongation-type synthetic resin film, and the liquid crystal coating-type polarizer may include liquid crystals arranged in a certain arrangement.

According to an embodiment of the present disclosure, the anti-reflection layer 600 may include a filter plate including a black matrix and color filters. The filter plate may include color filters, a black matrix, and an overcoat layer arranged in each pixel P. The arrangement of the color filters may be determined by taking into account emission colors of pixels P included in the display panel 10P. Thus, the desired color may be realized by filtering the light emitted by each of the pixels P with the color filter.

According to an embodiment of the present disclosure, the anti-reflection layer 600 may include a destructive interference structure. The destructive interference structure may include a first reflective layer and a second reflective layer arranged on different layers from each other. First reflected light and second reflected light respectively reflected by the first reflective layer and the second reflective layer may destructively interfere, and accordingly, external light reflectance may be reduced.

A cover window 700 may be arranged above the display panel 10P, and may be a flexible window. The cover window 700 may protect the display panel 10P as the cover window 700 is easily bent according to an external force without cracking. The cover window 700 may be made of a transparent insulating material, and may include, for example, glass, sapphire, or plastic. The cover window 700 may include, for example, tempered glass, ultra-thin glass (UTG), transparent polyimide (colorless polyimide (CPI)). In an embodiment of the present disclosure, the ultra-thin glass (UTG) for the cover window 700 may have a thickness of about 0.1 mm or less. According to an embodiment of the present disclosure, the cover window 700 may have a structure in which a flexible polymer layer is arranged on a surface of a glass substrate, or may include only a polymer layer.

The cover window 700 may be arranged on the anti-reflection layer 600 of the display panel 10P, and may be coupled to the anti-reflection layer 600 through an adhesive layer OCA such as an optically clear adhesive.

According to an embodiment of the present disclosure, the cover window 700 in FIGS. 5 and 6 is shown as arranged over the anti-reflection layer 600, but the present disclosure is not limited thereto. For example, in an embodiment of the present disclosure, positions of the anti-reflection layer 600 and the optical functional layer 500 may be exchanged with each other, and in this case, the cover window 700 may be coupled to the optical functional layer 500 through the adhesive layer OCA. According to an embodiment of the present disclosure, the adhesive layer OCA may be omitted between the cover window 700 and a layer under the cover window 700 (e.g., an anti-reflection layer 600 or an optical functional layer 500). The display panel 10P, the adhesive layer OCA and the cover window 700 may constitute a display apparatus 10 which may be display apparatus 1 or display apparatus 1'.

Referring to FIG. 6, the display apparatus 1 or 1' may include the display panel 10P and the cover window 700 for protecting an upper portion of the display panel 10P. FIG. 6 may be a cross-sectional view of the display apparatus 1 or 1' of FIG. 1 or 2, taken in a direction (e.g., the x-axis direction).

As described above, the display area DA may include the main display area MDA corresponding to the first area A1 and the first bending display area BDA1 and the second bending display area BDA2 respectively corresponding to the second areas A2 described above, and the first bending display area BDA1 and the second bending display area BDA2 may be bent with a radius of curvature R1. FIG. 6 illustrates that the first bending display area BDA1 and the second bending display area BDA2 have the same radius, which is the radius of curvature R1, but the present disclosure is not limited thereto. For example, in an embodiment of the present disclosure, the first bending display area BDA1 and the second bending display area BDA2 may have different radii of curvature.

The display apparatus 1 or 1' may include the adhesive layer OCA disposed between the display panel 10P and the cover window 700 for bonding the display panel 10P and the cover window 700 to each other. The adhesive layer OCA may be provided to have an area and a width the same as those of the display panel 10P. The cover window 700 may be bent or folded. Accordingly, the cover window 700 may bent together with the display panel 10P in the first bending display area BDA1 and the second bending display area BDA2. For example, the display apparatus 1 or 1' may include a bending area that is at least partially bent, and the display panel 10P and the cover window 700 corresponding to the bending area may be bent.

The adhesive layer OCA may be provided to attach the cover window 700 to the display panel 10P, and in particular, the reliability of the adhesive layer OCA may play an important role in bending areas (for example, the first bending display area BDA1 and the second bending display area BDA2). In a manufacturing process, after attaching the display panel 10P to the cover window 700 by using the adhesive layer OCA, a pressurization process for removing air bubbles from the bending areas under a high temperature (e.g., 60° C.) and a high pressure (e.g., 8 bar), for example, an Autoclave process, may be performed.

Here, as a comparative example, there is a problem in that bubbles re-penetrate an adhesive layer from which a pressure is removed after a pressurization process, and this is more likely to occur in a display apparatus having a bending area. The penetrating bubbles may be understood as bubbles that are trapped in an adhesive layer and are not able to escape when a gas dissolved in the adhesive layer under a high-temperature/high-pressure pressurization process (e.g., 60° C., 8 bar) is returned to room temperature/normal pressure (e.g., 25° C., 1 bar) after the pressurization process is completed. For example, the trapped bubbles may be aggregated and perceived as penetrating bubbles at edge portions of a display apparatus including a bending area. In the comparative example, the bubbles remained in the adhesive layer may degrade the image displayed by the display panel, and/or may degrade the protection of the display panel by the cover window.

In the display apparatus 1 or 1' according to an embodiment of the present disclosure, an adhesive composition included in the adhesive layer OCA in which the occurrence of the above-described penetrating bubbles is minimized is included. Accordingly, by preventing penetrating bubbles even after the pressurization process is completed, a defect rate in the bending areas may be reduced, and the reliability of the display apparatuses 1 and 1' may be enhanced. In other words, an adhesive composition according to an embodiment of the present disclosure is capable of reducing the formation of the penetrating bubbles at edge portions of the display apparatus 1 or 1' after an Autoclave process, and thus may enhance the reliability of the display apparatus 1 or 1'.

To this end, the adhesive layer OCA according to an embodiment of the present disclosure may include an adhesive composition including (meth)acrylate having an alicyclic group, a low-temperature glass transition (meth)acrylic monomer, (meth)acrylate having a hydroxyl group, a high-temperature glass transition (meth)acrylic monomer, and a reactive diluent monomer. In detail, the adhesive composition may include about 5 wt % to about 10 wt % of (meth)acrylate having an alicyclic group, about 20 wt % to about 30 wt % of a low-temperature glass transition (meth) acrylic monomer, and about 5 wt % to about 15 wt % of (meth)acrylate having a hydroxyl group, and about 40 wt % to about 60 wt % of a high-temperature glass transition (meth)acrylic monomer, and about 10 wt % to about 20 wt % of a reactive diluent monomer. The term "(meth)acrylic monomer" described herein may include acrylic acid monomer, methacrylic acid monomer, or one of the salts or esters of acrylic or methacrylic acid monomer.

The (meth)acrylate having an alicyclic group may include, for example, at least one of isobornyl (meth)acrylate, bornyl (meth)acrylate, or cyclohexyl (meth)acrylate. For example, the (meth)acrylate having an alicyclic group may be isobornyl (meth)acrylate (IBOA). The (meth)acrylate having an alicyclic group may include a (meth)acrylate having a homopolymer having a glass transition temperature of about 90° C. or higher, for example, about 90° C. to about 120° C. That is, the homopolymer formed of the (meth)acrylate monomer having an alicyclic group may have a glass transition temperature of about 90° C. or higher. The (meth)acrylate having an alicyclic group may be included in about 5 wt % to about 10 wt %, for example, in about 4 wt % to about 8 wt %. In the above range, the exfoliation force of the adhesive layer OCA and a modulus of the adhesive layer OCA may be increased, and stable folding properties of the adhesive layer OCA may be ensured.

The low-temperature glass transition (meth)acrylic monomer may include, for example, at least one of benzyl (meth)acrylate, n-butyl (meth)acrylate, sec-butyl (meth)acrylate, cyclohexyl (meth)acrylate, iso-decyl (Meth)acrylate, n-decyl (meth)acrylate, lauryl (meth)acrylate, 2-ethylhexyl (meth)acrylate (2-EHA), 2-(2-ethoxyethoxy)ethyl (meth)acrylate, n-hexyl (meth)acrylate, or n-octyl (meth)acrylate. The low-temperature glass transition (meth)acrylic monomer may include (meth)acrylate including a homopolymer having a glass transition temperature from about −100° C. to about 40° C., for example, from about −80° C. to about 30° C., or for example, from about −75° C. to about −20° C. That is, the low-temperature glass transition (meth) acrylic monomer may indicate that a homopolymer formed of this kind of monomer has a low glass transition temperature, for example, from about −100° C. to about 40° C. The low-temperature glass transition (meth)acrylic monomer may be included in about 20 wt % to about 30 wt %, for example, in about 24 wt % to about 28 wt %.

The (meth)acrylate having a hydroxyl group may include a (meth)acrylate including at least one hydroxyl group. The hydroxyl group-containing (meth)acrylate may include, for example, at least one of 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate (4-HBA), 6-hydroxyhexyl (meth)acrylate, 1,4-cyclohexanedimethanol mono (meth)acrylate, 1-chloro-2-hydroxypropyl (meth)acrylate, diethylene glycol mono (meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl(meth)acrylate, 4-hydroxycyclopentyl (meth)acrylate, 4-hydroxycyclohexyl (meth)acrylate, or cyclohexanedimethanol mono (meth)acrylate. The (meth)acrylate having a hydroxyl group may provide an adhesive force of an adhesive film such as the adhesive layer OCA.

The (meth)acrylate having a hydroxyl group may be included in about 5 wt % to about 15 wt %, for example, in about 9 wt % to about 13 wt %. In the above range, an adhesive force and durable reliability of the adhesive layer OCA may be further enhanced, and a ratio of shear strength in the adhesive layer OCA may be ensured.

The high-temperature glass transition (meth)acrylic monomer may include, for example, at least one of tert-butyl methacrylate, acryloylmorpholine (4-AcMo), methyl (meth) acrylate, phenyl (meth)acrylate, or isobornyl (meth)acrylate. The high-temperature glass transition (meth)acrylic monomer may include (meth)acrylate including a homopolymer having a glass transition temperature from about 50° C. to about 180° C., for example, from about 70° C. to about 170° C., or for example, from about 80° C. to about 160° C. That is, the high-temperature glass transition (meth)acrylic monomer may indicate that a homopolymer formed of this kind of monomer has a high glass transition temperature, for example, from about 50° C. to about 180° C. The high-temperature glass transition (meth)acrylic monomer may be included in about 40 wt % to about 60 wt %, for example, in about 41 wt % to about 55 wt %.

As the reactive diluent monomer, any monomer having a reactive functional group such as a (meth)acryloyl group in a molecular structure may be used without limitations. Examples of the above monomer include alkyl (meth) acrylate; hydroxy group-containing monomer such as hydroxyethyl (meth)acrylate, hydroxypropyl (meth)acrylate or hydroxybutyl (meth)acrylate; carboxyl group-containing monomer such as (meth)acrylic acid or beta-carboxyethyl (meth)acrylate; alkoxy group-containing monomer such as 2-(2-ethoxyethoxy)ethyl (meth)acrylate; aromatic group-containing monomer such as benzyl (meth)acrylate or phenoxyethyl (meth)acrylate; heterocyclic moiety-containing monomer such as tetrahydrofurfuryl (meth)acrylate or (meth)acryloyl morpholine; and a multi-functional (meth)acrylate, but the present disclosure is not limited thereto. For example, the multi-functional (meth)acrylate may include di(meth)acrylate, tri(meth)acrylate, tetra(meth)acrylate, penta(meth)acrylate, etc.

The reactive diluent monomer may be included in a range from about 10 wt % to about 20 wt %, for example, from about 11 wt % to about 15 wt %. The above monomer may have a function of adjusting a viscosity of a composition and implementing an adhesive force thereof after curing.

FIG. 7 is a table comparing monomer components of an embodiment of the present disclosure including an adhesive composition and comparative examples. FIG. 8 is a table comparing an embodiment of the present disclosure including an adhesive composition according to an embodiment of the present disclosure to comparative examples, according to generation of penetrating bubbles.

Referring to FIG. 7, the adhesive composition according to the embodiment of the present disclosure may include, for example, materials of an embodiment of the present disclosure below.

EMBODIMENT

The adhesive composition according to the embodiment of the present disclosure may include 2-ethylhexyl acrylate (2-EHA), isobornyl acrylate (IBOA), octyl methacrylate, 4-hydroxybutyl acrylate (4-HBA), acryloylmorpholine (4-acryloyl morpholine (4-AcM)), and benzyl acrylate.

COMPARATIVE EXAMPLE

In the table of FIG. 7, Comparative Examples B, C, D, E, and F are disclosed. Like the embodiment of the present disclosure, the comparative examples also commonly include 2-ethylhexyl acrylate (2-EHA), isobornyl acrylate (IBOA), and octyl methacrylate. Comparative Example D includes a small amount of isophorone diisocynate (IPDI).

Unlike the comparative examples, the adhesive composition according to the embodiment of the present disclosure further includes 4-hydroxybutyl acrylate (4-HBA), acryloylmorpholine (4-acryloyl morpholine (4-AcM)), and benzyl acrylate.

The above results may indicate factors that have caused a difference as to whether penetrating bubbles are generated or not and to what extent they are generated, as shown in the tables of FIGS. 7 and 8. The 'penetrating bubbles' described in the table of FIG. 7 refer to bubbles generated in the adhesive layer OCA after attaching the adhesive layer OCA in a manufacturing process. The 'penetrating bubbles' may be generated in the adhesive layer OCA as a temperature and pressure in the adhesive layer OCA decrease or may be generated due to penetration of external air.

During a manufacturing process, after attaching the display panel 10P to the cover window 700 by using the adhesive layer OCA, a pressurization process for removing bubbles from the adhesive layer OCA is performed at a high temperature (e.g., 60° C.), that is, an Autoclave process is performed, and bubbles may be generated in the adhesive layer, from which a pressure is removed, after the pressurization process, and the bubbles may act as a defect factor of a display panel. The bubbles generated after attaching of an adhesive layer as described above may be defined as 'penetrating bubbles'.

In the tables of FIGS. 7 and 8, the number of penetrating bubbles generated per each experiment sample is defined as a penetrating bubble generation ratio, i.e., the penetrating bubble generation ratio=(number of generated penetrating bubbles/number of experiment samples).

In the embodiment of the present disclosure, no penetrating bubbles were generated in all of 18 experiment samples. In Comparative Example B, penetrating bubbles were generated in 6 out of 19 experiment samples; in Comparative Example C, penetrating bubbles were generated in 13 out of 19 experiment samples; in Comparative Example D, penetrating bubbles were generated in all of 18 experiment samples; in Comparative Example E, penetrating bubbles were generated in 5 out of 18 experiment samples; and in Comparative Example F, penetrating bubbles were generated in 4 out of 18 experiment samples. In Comparative Example B, the size of the penetrating bubbles was in a range from 39 µm to 120 µm and the penetration distance was in a range from 320 µm to 430 µm; in Comparative Example C, the size of the penetrating bubbles was in a range from 75 µm to 105 µm and the penetration distance was in a range from 210 µm to 362 µm; in Comparative Example D, the size of the penetrating bubbles was in a range from 50 µm to 72 µm and the penetration distance was in a range from 366 µm to 433 µm; in Comparative Example E, the size of penetrating bubbles was in a range from 114 µm to 141 µm and the penetration distance was in a range from 356 µm to 456 µm; and in Comparative Example F, the size of the penetrating bubbles was in a range from 100 µm to 190 µm and the penetration distance was in a range from 240 µm to 340 µm.

As a result, in Comparative Examples B, C, D, E, and F, it can be confirmed that a defective rate due to the generation of penetrating bubbles was 22% to 100%.

Figure 10:
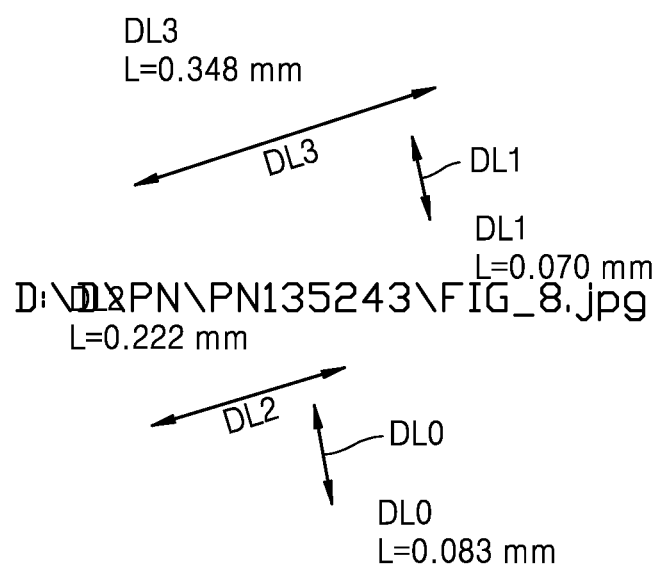
FIG. 10 shows a result of an experiment in which penetrating bubbles of Comparative Example A of FIG. 9 were generated.

FIG. 9 is a table comparing specific components and generation of penetrating bubbles of an embodiment of the present disclosure including an adhesive composition according to an embodiment of the present disclosure and a comparative example (Comparative Example A). FIG. 10 shows a result of an experiment in which penetrating bubbles of a first sample (#1) of Comparative Example A of FIG. 9 were generated.

Referring to FIG. 9, component values of the embodiment of the present disclosure and Comparative Example A were compared. Comparative Example A has a composition different from those of the comparative examples of FIG. 7 described above (i.e., Comparative Examples B, C, D, E, and F), and includes materials the same as those of the embodiment of the present disclosure but in a different composition.

According to an embodiment of the present disclosure, the embodiment of the present disclosure shown in FIG. 9 includes 6.31 wt % of isobornyl acrylate (IBOA), 26.34 wt % of 2-ethylhexyl acrylate (2-EHA), 11.31 wt % of 4-hydroxybutyl acrylate (4-HBA), 42.57% of acryloylmorpholine (4-acryloyl morpholine (4-AcM)), and 13.48 wt % of benzyl acrylate. Comparative Example A includes 5.94 wt % of isobornyl acrylate (IBOA), 16.21 wt % of 2-ethylhexyl acrylate (2-EHA), 12.68 wt % of 4-hydroxybutyl acrylate (4-HBA), 32.16 wt % of acryloylmorpholine (4-acryloyl morpholine (4-AcM)), and 33.00 wt % benzyl acrylate.

The biggest difference between the compositions according to the embodiment of the present disclosure and Comparative Example A is that a portion of acryloylmorpholine is increased from 32.16 wt % to 42.57 wt % and a portion of benzyl acrylate is reduced from 33.00 wt % to 13.48 wt % in the embodiment of the present disclosure. The adhesive composition according to the embodiment of the present disclosure includes a high-temperature glass transition (meth)acrylic monomer, and it was experimentally discovered that penetration of bubbles into the adhesive layer OCA hardly occurs as a tensile strength of the adhesive composition is increased when a content ratio of the high-temperature glass transition (meth)acrylic monomer is increased.

In addition, the adhesive composition according to the embodiment of the present disclosure includes a reactive dilution monomer, and it was found through the above experiment that the reactive dilution monomer is a component that affects the folding property of the adhesive composition, and the lower the portion of the reactive dilution monomer, the higher the tensile strength of the adhesive composition, thus rendering the effect of bubbles hardly penetrating the adhesive layer OCA.

Referring to the results of the experiment according to generation of penetrating bubbles in the table of FIG. 9, 2 mm×2 mm adhesive composition samples were prepared, and pressurization was performed under a high-temperature and high-pressure condition (e.g., 60° C., 8 bar) as the Autoclave process conditions, and then the pressure was removed to check penetrating bubbles generated in each sample.

As a result of the first experiment (#1), it was confirmed that two penetrating bubbles were generated in Comparative Example A, and as a result of a second experiment (#2), it was confirmed that 4 to 5 penetrating bubbles were generated in Comparative Example A.

FIG. 10 is a photographic image of the penetrating bubbles generated in Comparative Example A as a result of the first experiment (#1). Referring to FIG. 10, it was found that the diameters of the penetrating bubbles were 0.083 mm and 0.070 mm, respectively, and the distances of the penetrating bubbles from edges of the samples were 0.222 mm and 0.348 mm, respectively. As a result of summing all penetrating bubbles of the second experiment (#2), the size of the penetrating bubbles was in a range from 70 μm to 114 μm, and a distance of the penetrating bubbles from the edge of the sample was in a range from 166 μm to 348 μm. The size and distance of the penetrating bubbles are ones that a user may visually recognize or that may act as a path for moisture permeation even when they are not visually recognized, thereby deteriorating the reliability of the entire display apparatus.

On the other hand, it was confirmed from both a first experiment (#1) and a second experiment (#2) of the embodiment of the present disclosure that no penetrating bubbles were generated. As described above, in the embodiment of the present disclosure, by relatively increasing the portion of acryloylmorpholine to 42.57 wt % and relatively reducing the portion of benzyl acrylate to 13.48 wt %, the adhesive layer OCA may be imparted with relatively hard physical properties, thereby preventing generation of penetrating bubbles. For example, within the materials of (meth) acrylate having an alicyclic group, a low-temperature glass transition (meth)acrylic monomer, (meth)acrylate having a hydroxyl group, a high-temperature glass transition (meth) acrylic monomer, and a reactive diluent monomer included in the composition, different from Comparative Example A, the adhesive composition according to an embodiment of the present disclosure including about 40 wt % to about 60 wt % of a high-temperature glass transition (meth)acrylic monomer (e.g., 42.57 wt % of acryloylmorpholine) and about 10 wt % to about 20 wt % of a reactive dilution monomer (e.g., 13.48 wt % of benzyl acrylate) is capable of reducing the penetrating bubbles, thereby enhancing the reliability of the display apparatus.

Figure 11:
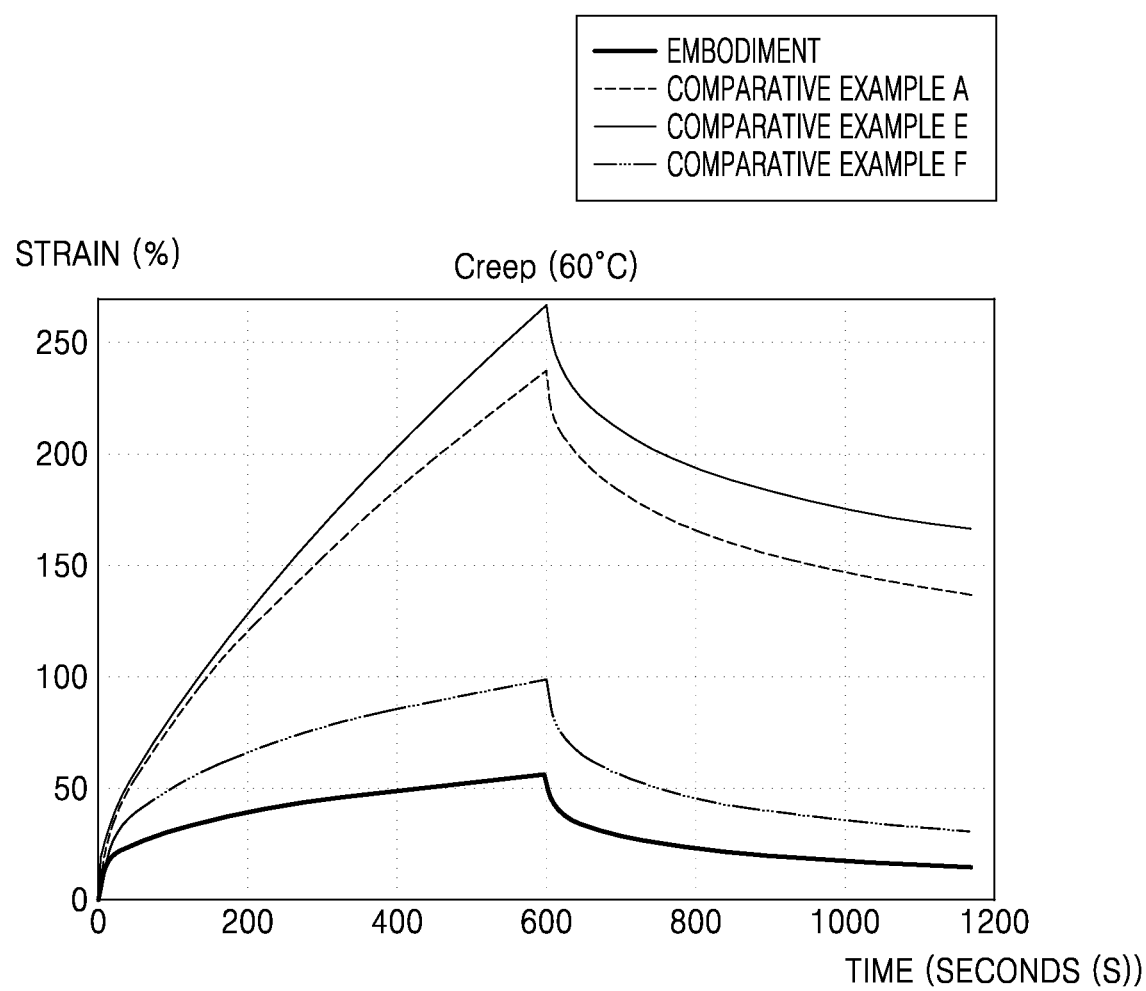
FIG. 11 is a graph showing a strain of an embodiment of the present disclosure and comparative examples according to creep characteristics.
Figure 12:
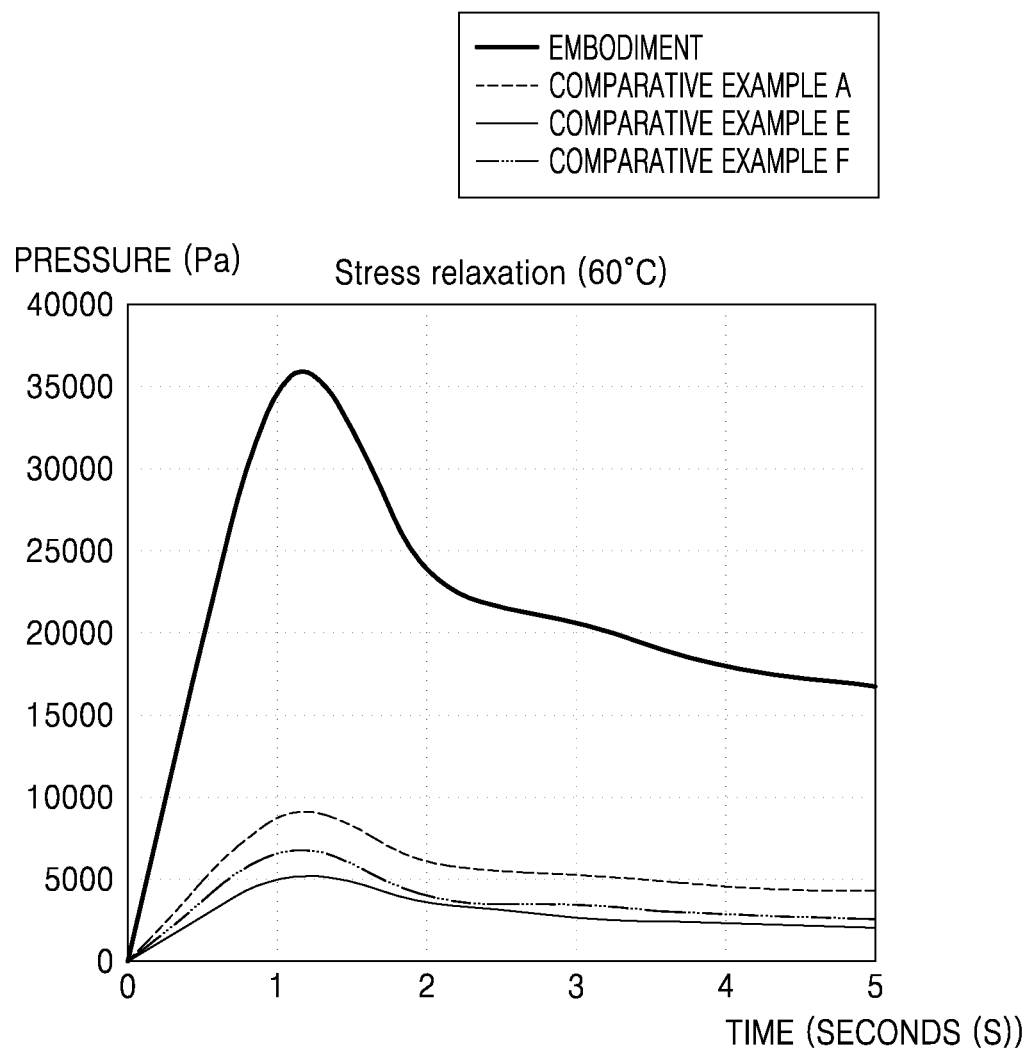
FIG. 12 is a graph showing measurement of stress relaxation characteristics of an embodiment of the present disclosure and comparative examples.
Figure 13:
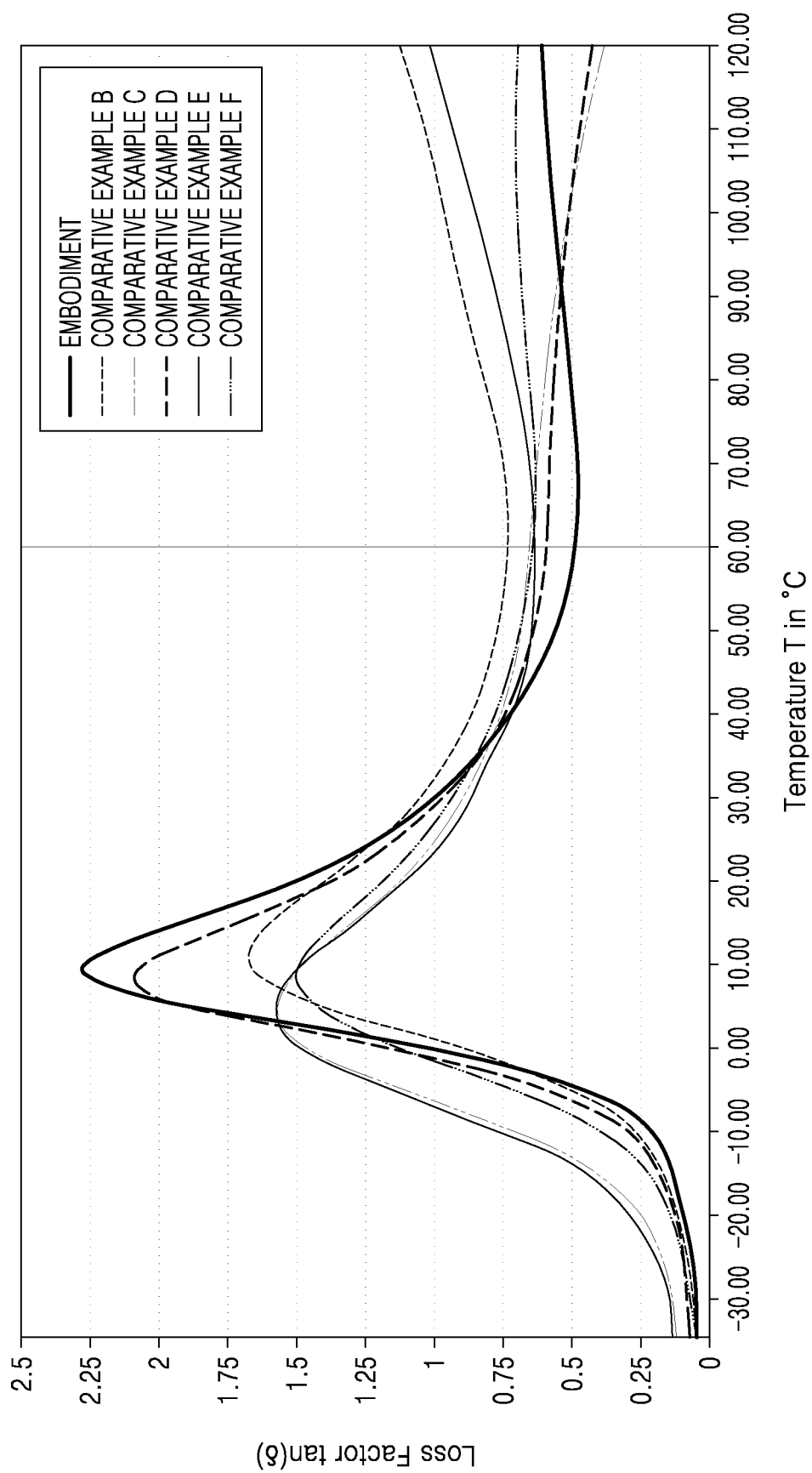
FIG. 13 is a graph showing loss factors (tan δ) of an embodiment of the present disclosure and comparative examples.

FIG. 11 is a graph showing a strain of the embodiment of the present disclosure and the comparative examples according to creep characteristics. FIG. 12 is a graph showing measurement of stress relaxation characteristics of the embodiment of the present disclosure and the comparative examples. FIG. 13 is a graph showing loss factors (tan δ) of the embodiment of the present disclosure and the comparative examples.

Referring to FIGS. 11 to 13, the adhesive composition according to the present embodiment may have a strain of 50% to 60% at 60° C. according to creep characteristics. Also, a stress relaxation maximum value of stress of the adhesive composition, with the stress changing over time when a strain of 25% at 60° C. is applied to the adhesive layer of the adhesive composition, may be from about 30000 Pa to about 40000 Pa. This may indicate that the maximum value of the stress that appears when measuring the stress relaxation of the adhesive composition at 60° C. is from about 30000 Pa to about 40000 Pa. Also, tan δ of the adhesive composition at 60° C. may be from about 0.4 to about 0.55.

Herein, "creep" refers to a shear strain occurring as a result of laminating the sample for measuring a creep, in a cylindrical shape a×b (thickness×diameter) (e.g., 600 μm×8 mm) and applying shear stress to the sample for measuring creep at 60° C. for 600 seconds at 2000 Pa. Creep may be measured using a TEXTURE ANALYZER TA.XT PLUS (load cell 5 kg, EKO Instruments), a rheometer, and the like. Hereinafter, the experimental results regarding creep characteristics were measured using a rheometer.

Referring to the graph of FIG. 11, in Comparative Example A, Comparative Example E, and Comparative Example F, the strain was 100% or more at 600 seconds. In detail, in Comparative Example A and Comparative Example E, the strain was about 250% at 600 seconds, and in Comparative Example F, the strain was about 100% at 600 seconds.

On the other hand, in the embodiment of the present disclosure, the strain was found to be 50% to 60% at 600 seconds. As described above, when the same amount of force is applied to the samples for the same period of time, it is seen that the lower the strain according to the creep characteristics, the harder the physical properties are. The adhesive layer OCA including the adhesive composition according to the embodiment of the present disclosure had a strain of 50% to 60% at 60° C. according to the creep characteristic as described above, and has relatively hard physical properties to prevent or minimize generation of penetrating bubbles. For example, the adhesive composition according to the embodiment of the present disclosure has a strain (e.g., 50% to 60%) at 60° C. according to the creep characteristic described above lower than each of a strain of Comparative Example A (e.g., 200% to 250%), a strain of Comparative Example E (e.g., >250%), and a strain of Comparative Example F, (e.g., about 100%), thereby capable of preventing generation of penetrating bubbles in comparison to Comparative Example A, Comparative Example E, and Comparative Example F.

Herein, "stress relaxation" may be tested using the same samples as those used in the experiments regarding the creep. "Stress relaxation" is a measurement of a stress value obtained by applying the same amount of strain to the samples. A stress required to maintain a strain of 25% applied to a sample by using shear stress for 10 minutes (600 seconds) is shown in the experiment of FIG. 12 by using a rheometer. A decrease in the stress inside an object over time when the instantaneously applied strain is maintained uniform as described above is referred to as "stress relaxation". A stress required to maintain constant a strain instantaneously applied to a sample is highest at the moment when the strain is applied (e.g., about 1 second) and gradually decreases over time. A phenomenon in which a stress inside an object decreases over time when the instantaneously applied strain is kept constant, is referred to as stress relaxation.

Referring to the graph of FIG. 12, when measuring the stress relaxation, the stress over time has a maximum value at about the first 1 second, and then gradually decreases with the passage of time. In Comparative Examples A, E, and F, a maximum value of a stress measured at about the first 1 second had a value of about 5000 Pa to about 10000 Pa, whereas in the embodiment of the present disclosure, a maximum value of a stress measured at around the first 1 second was about 30000 Pa to about 40000 Pa, for example, about 35000 Pa to about 36000 Pa. That is, a maximum value of stress of the adhesive composition according to the embodiment of the present disclosure, with the stress changing over time when a strain of 25% is applied at 60° C. to an adhesive layer OCA of the adhesive composition, is from about 30000 Pa to about 40000 Pa. Here, the adhesive layer OCA including the adhesive composition may be laminated to a cylindrical shape a×b (thickness×diameter) (e.g., 600 μm×8 mm) for the stress relaxation test. Because the maximum value of the stress in the stress relaxation measurement of the adhesive layer OCA including the adhesive composition according to the embodiment of the present disclosure is about 3 to 8 times that of the comparative examples, it can be seen that the adhesive layer OCA has relatively hard physical properties, thus preventing or minimizing generation of bubbles in the adhesive layer OCA.

Referring to FIG. 13, tan δ (loss factor) is a ratio of loss modulus to a storage modulus, and may be expressed by the following equation: tan δ=(loss modulus/storage modulus).

As in the experiment of FIG. 13, the loss modulus and the storage modulus in the present disclosure were measured while fixing shear stress and raising a measurement temperature from a low value to a high value. Therefore, by comparing the elasticity of the embodiment of the present disclosure and the comparative examples at respective temperatures based on tan δ of each temperature, a degree of relieving the stress when the adhesive layer OCA is folded is evaluated, and the folding properties of the adhesive layer OCA may be evaluated, accordingly.

As described above, the tan δ value of the embodiment of the present disclosure according to the graph of FIG. 13 under the identical temperature condition as the pressurization process according to an embodiment of the present disclosure, that is, the Autoclave process, at 60° C. was the lowest among the other comparative examples. At 60° C., the tan δ value of the embodiment of the present disclosure was about 0.4 to about 0.55. This may indicate that the adhesive layer according to the embodiment of the present disclosure has hard physical properties as shown in FIGS. 11 and 12 described above, and at the same time has excellent elasticity at 60° C. as shown in FIG. 13, thus providing better conditions during folding and bending.

As a display apparatus according to an embodiment of the present disclosure includes the adhesive composition as described above and the adhesive layer OCA including the adhesive composition, the display apparatus may be easily bent and also, generation of penetrating bubbles in the adhesive layer OCA may be effectively prevented.

According to an embodiment of the present disclosure as described above, an adhesive composition having enhanced reliability at edge portions of a display apparatus and the display apparatus may be implemented. However, the present disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While specific embodiments have been described with reference to the figures, it will be understood by those of ordinary skill in the art that various changes in form and details may be made therein without departing from the spirit and scope of the present disclosure as defined by the appended claims.

What is claimed is:

1. An adhesive composition comprising:
(meth)acrylate having an alicyclic group;
a low-temperature glass transition (meth)acrylic monomer that can form a homopolymer having a glass transition temperature from about −100° C. to about 40° C.;
(meth)acrylate having a hydroxyl group;
a high-temperature glass transition (meth)acrylic monomer that can form a homopolymer having a glass transition temperature from about 50° C. to about 180° C.; and
a reactive diluent monomer,
wherein a maximum value of stress of the adhesive composition, with the stress changing over time when a strain of 25% is applied at 60° C. to an adhesive layer of the adhesive composition, is from about 30000 Pa to about 40000 Pa.

2. The adhesive composition of claim 1, wherein the (meth)acrylate having an alicyclic group is included in about 5 wt % to about 10 wt %.

3. The adhesive composition of claim 1, wherein the low-temperature glass transition (meth)acrylic monomer is included in about 20 wt % to about 30 wt %.

4. The adhesive composition of claim 1, wherein the (meth)acrylate having a hydroxyl group is included in about 5 wt % to about 15 wt %.

5. The adhesive composition of claim 1, wherein the high-temperature glass transition (meth)acrylic monomer is included in about 40 wt % to about 60 wt %.

6. The adhesive composition of claim 1, wherein the reactive diluent monomer is included in about 10 wt % to about 20 wt %.

7. The adhesive composition of claim 1, wherein a strain of the adhesive composition at 60° C. according to creep characteristics is from about 50% to about 60%.

8. The adhesive composition of claim 1, wherein tan δ of the adhesive composition at 60° C. is from about 0.4 to about 0.55.

9. The adhesive composition of claim 1, wherein the high-temperature glass transition (meth)acrylic monomer comprises acryloylmorpholine.

10. A display apparatus comprising:
a display panel;
a cover window arranged on the display panel; and
an adhesive layer interposed between the display panel and the cover window,
wherein the adhesive layer comprises an adhesive composition comprising:
(meth)acrylate having an alicyclic group;
a low-temperature glass transition (meth)acrylic monomer that can form a homopolymer having a glass transition temperature from about −100° C. to about 40° C.;
(meth)acrylate having a hydroxyl group;
a high-temperature glass transition (meth)acrylic monomer that can form a homopolymer having a glass transition temperature from about 50° C. to about 180° C.; and
a reactive diluent monomer,
wherein a maximum value of stress of the adhesive composition, with the stress changing over time when a strain of 25% is applied at 60° C. to the adhesive layer, is from about 30000 Pa to about 40000 Pa.

11. The display apparatus of claim 10, wherein the (meth)acrylate having an alicyclic group is included in about 5 wt % to about 10 wt %.

12. The display apparatus of claim 10, wherein the low-temperature glass transition (meth)acrylic monomer is included in about 20 wt % to about 30 wt %.

13. The display apparatus of claim 10, wherein the (meth)acrylate having a hydroxyl group is included in about 5 wt % to about 15 wt %.

14. The display apparatus of claim 10, wherein the high-temperature glass transition (meth)acrylic monomer is included in about 40 wt % to about 60 wt %.

15. The display apparatus of claim 10, wherein the reactive diluent monomer is included in about 10 wt % to about 20 wt %.

16. The display apparatus of claim 10, wherein a strain of the adhesive composition at 60° C. according to creep characteristics is from about 50% to about 60%.

17. The display apparatus of claim 10, wherein tan δ of the adhesive composition at 60° C. is from about 0.4 to about 0.55.

18. The display apparatus of claim 10, wherein the high-temperature glass transition (meth)acrylic monomer comprises acryloylmorpholine.

19. The display apparatus of claim 10, wherein the display panel comprises:
 a display layer comprising a display element; and
 an optical functional layer arranged above the display layer,
 wherein the optical functional layer comprises a polarization film or a color filter layer.

20. The display apparatus of claim 10, wherein the display apparatus includes a bending area that is at least partially bent, and
 the display panel and the cover window corresponding to the bending area are bent.

\* \* \* \* \*